United States Patent
Umegaki (10) Patent No.: US 11,458,928 B2
(45) Date of Patent: Oct. 4, 2022

(54) VEHICLE CONTROL APPARATUS

(71) Applicant: DENSO CORPORATION, Kariya (JP)

(72) Inventor: Nobuo Umegaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/208,217

(22) Filed: Mar. 22, 2021

(65) Prior Publication Data

US 2021/0206348 A1 Jul. 8, 2021

Related U.S. Application Data

(63) Continuation of application No. PCT/JP2019/036599, filed on Sep. 18, 2019.

(30) Foreign Application Priority Data

Sep. 25, 2018 (JP) .............................. JP2018-178671

(51) Int. Cl.
*B60R 25/24* (2013.01)
*B60R 25/02* (2013.01)
*B60R 25/40* (2013.01)
*G07C 9/00* (2020.01)

(52) U.S. Cl.
CPC ............ *B60R 25/245* (2013.01); *B60R 25/02* (2013.01); *B60R 25/40* (2013.01); *G07C 9/00309* (2013.01); *G07C 2009/00349* (2013.01); *G07C 2009/00769* (2013.01)

(58) Field of Classification Search
None
See application file for complete search history.

(56) References Cited

U.S. PATENT DOCUMENTS 10,349,220 B2 * 7/2019 Yamaguchi ............. B60R 25/24
2004/0196141 A1 10/2004 Yoshida et al.
2006/0238296 A1 10/2006 Konno
(Continued)

FOREIGN PATENT DOCUMENTS

JP 2004308135 A 11/2004
JP 2006306161 A 11/2006
(Continued)

OTHER PUBLICATIONS

U.S. Appl. No. 17/208,654, filed Mar. 22, 2021, Nobuo Umegaki.

*Primary Examiner* — Carlos Garcia
(74) *Attorney, Agent, or Firm* — Harness, Dickey & Pierce, P.L.C.

(57) ABSTRACT

A vehicle control apparatus is mounted on a vehicle to perform wireless communication with a portable terminal. The vehicle control apparatus includes a first processor and a second processor. The first processor execute a first process to determine whether or not a wireless signal is a regular wireless signal transmitted from the portable terminal. The second processor executes a second process including an authentication of the portable terminal in response to the received wireless signal being determined to be the regular wireless signal, and does not execute the second process in response to the received wireless signal being determined to be not the regular wireless signal. Herein, a power consumption when the first processor executes the first process is smaller than a power consumption when the second processor executes the second process.

6 Claims, 8 Drawing Sheets

(56) References Cited

U.S. PATENT DOCUMENTS

| | | | |
|---|---|---|---|
| 2008/0164984 A1* | 7/2008 | Sheffer | .......... H04K 3/226 |
| | | | 340/426.13 |
| 2013/0205295 A1 | 8/2013 | Ebcioglu et al. | |
| 2019/0007049 A1 | 1/2019 | Wu | |

FOREIGN PATENT DOCUMENTS

| | | |
|---|---|---|
| JP | 2015045183 A | 3/2015 |
| JP | 2015510186 A | 4/2015 |
| JP | 6324578 B1 | 5/2018 |
| WO | WO-2017020165 A1 | 2/2017 |

\* cited by examiner

FIG. 1

10: VEHICLE CONTROL APPARATUS
21: RF ANTENNA
22: RF RECEIVE CIRCUIT
31: LF ANTENNA
32: LF TRANSMIT CIRCUIT
50: CAN
61: BODY ECU
62: ENGINE ECU
100: VEHICLE
500: VEHICLE SYSTEM

VEHICLE CONTROL APPARATUS

CROSS REFERENCE TO RELATED APPLICATIONS

The present application is a continuation application of International Patent Application No. PCT/JP2019/036599 filed on Sep. 18, 2019, which designated the U.S. and claims the benefit of priority from Japanese Patent Application No. 2018-178671 filed on Sep. 25, 2018. The entire disclosures of all of the above applications are incorporated herein by reference.

TECHNICAL FIELD

The present disclosure relates to a vehicle control apparatus.

BACKGROUND

Vehicle control apparatuses mounted on vehicles may include a vehicle control apparatus that wirelessly communicates with a portable terminal carried by a user of the vehicle to realize a smart entry function or a remote keyless entry function. The smart entry function means a function of unlocking the door of the vehicle when the portable terminal enters a wireless communication area near the vehicle. Further, the remote keyless entry means a function of locking or unlocking the door of the vehicle according to the operation of the switch of the portable terminal. Generally, such a vehicle control apparatus, which may also be called an in-vehicle apparatus, can receive a signal in an RF band (for example, 300 MHz to 400 MHz) transmitted from a portable terminal, and can transmit a signal in an LF band (for example, 30 kHz to 300 kHz) to the portable terminal.

SUMMARY

According to an example of the present disclosure, a vehicle control apparatus is mounted on a vehicle to perform wireless communication with a portable terminal. The vehicle control apparatus includes a first processor and a second processor. The first processor execute a first process to determine whether or not a wireless signal is a regular wireless signal transmitted from the portable terminal. The second processor executes a second process including an authentication of the portable terminal in response to the received wireless signal being determined to be the regular wireless signal, and does not execute the second process in response to the received wireless signal being determined to be not the regular wireless signal. Herein, a power consumption when the first processor executes the first process is smaller than a power consumption when the second processor executes the second process.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

A. First Embodiment

A1. Apparatus Configuration

Figure 1:
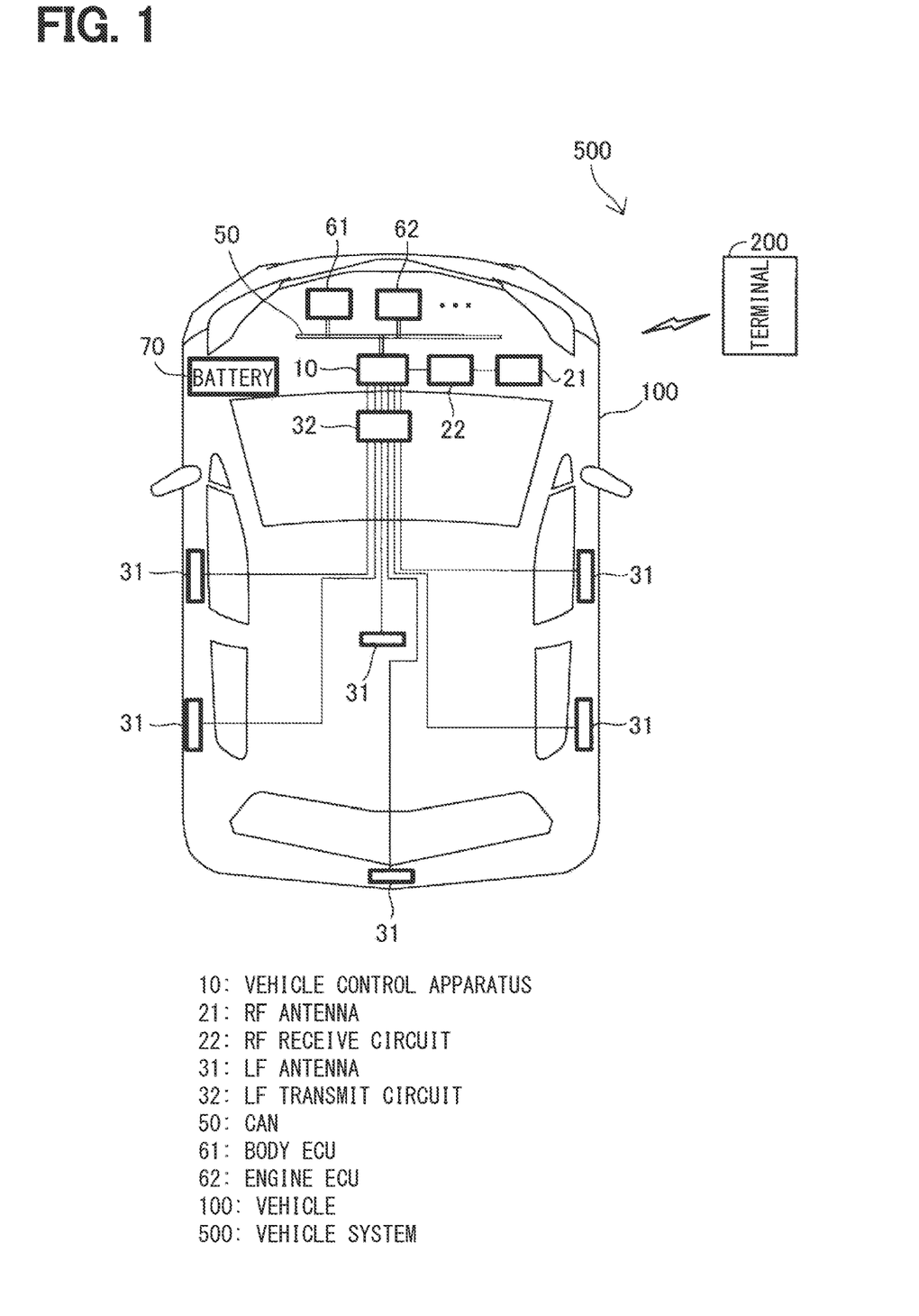
FIG. 1 is a block diagram showing schematic configurations of (i) a vehicle equipped with a vehicle control apparatus as a first embodiment of the present disclosure and (ii) a vehicle system including the vehicle control apparatus.

As shown in FIG. 1, a vehicle control apparatus 10 according to a first embodiment is used by being mounted on a vehicle 100 as a part of a vehicle system 500. The vehicle system 500 implements remote keyless entry. The remote keyless entry means that when the user of the vehicle 100 operates a push switch (not shown) of a portable terminal 200, the door of the vehicle 100 is opened, closed, unlocked, locked, etc. according to the operation. A smart entry may be realized instead of the remote keyless entry or in addition to the remote keyless entry. The smart entry means (i) that the door of the vehicle 100 is unlocked when the user of the vehicle 100 carrying the portable terminal 200 enters a wireless communication area near the vehicle 100, and (ii) that the vehicle 100 is started by the user sitting in the driver's seat while carrying the portable terminal 200 and operating a predetermined switch. The vehicle control apparatus 10 is also called an in-vehicle apparatus.

The vehicle system 500 includes the vehicle control apparatus 10 and the portable terminal 200, which can wirelessly communicate with each other. The portable terminal 200 is used by being carried by a user as an electronic key for the vehicle 100. The portable terminal 200 includes, in addition to the push switch not shown, (i) a configuration for transmitting a signal in the RF band (for example, 300 MHz to 400 MHz) (hereinafter referred to as "RF signal"), and (ii) a configuration for receiving a signal in the LF band (30 kHz to 300 kHz) (hereinafter referred to as "LF signal"). The configuration for transmitting the RF signal may include an antenna, an amplification circuit, a modulation circuit, and a control IC (Integrated Circuit).

Figure 5:
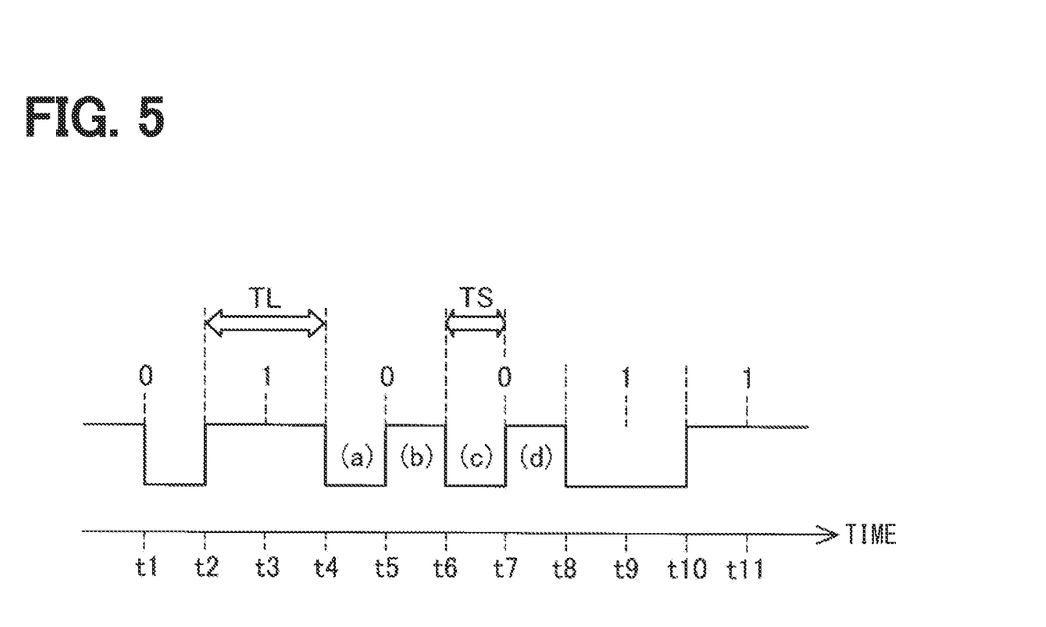
FIG. 5 is an explanatory diagram showing an example of encoding with a bi-phase FSK system.

In the present embodiment, the portable terminal 200 and the vehicle control apparatus 10 adopt a bi-phase FSK (Frequency Shift Keying) system (i.e., type) as a modulation and encoding process in RF band wireless communication. As shown in FIG. 5, in an encoding process in the bi-phase FSK system (i.e., bi-phase FSK encoding process), the data "1" is represented by the entire code 1-bit cycle with either H (High) or L (Low), and the data "0" is represented by switching between L and H at half cycle that is almost half the code 1 bit cycle (hereinafter referred to as "half bit cycle"). In FIG. 5, in order to facilitate understanding, times t1 to t11 for each half bit cycle are shown together with the encoded signals. For example, from time t2 to t4, the encoded signal represents data "1". From time t4 to t6, the encoded signal represents data "0". In this way, in bi-phase FSK encoding process, L or H that switches at a half-bit cycle is defined as a short bit; L or H that switches in the code 1 bit cycle is defined as a long bit. That is, in bi-phase FSK encoding process, two consecutive short bits represent "0" and a single long bit represents "1". In the bi-phase FSK encoding process, in order to clarify the boundary of each bit clear, when the data "1 s" are consecutive, H and L are switched between the long bit of the preceding "1" and the long bit of the following "1". When the data "0s" are consecutive, H and L are switched between the short bit in the latter half of the previous "0" and the short bit in the first half of the subsequent "0". In a modulation process in the bi-phase FSK system (i.e., bi-phase FSK modulation process), the frequency of a digital signal as shown in FIG. 5 is switched between long bits and short bits, and the digital signal is output as an analog signal. In other words, it can be said that the bi-phase FSK modulation process is a modulation process corresponding to the bi-phase FSK encoding process. The control IC for transmitting the RF signal of the portable terminal 200 performs the encryption process on the data to be transmitted.

The configuration for receiving the LF signal described above includes an antenna, an amplifier circuit, an encoding circuit, and a control IC.

Figure 2:
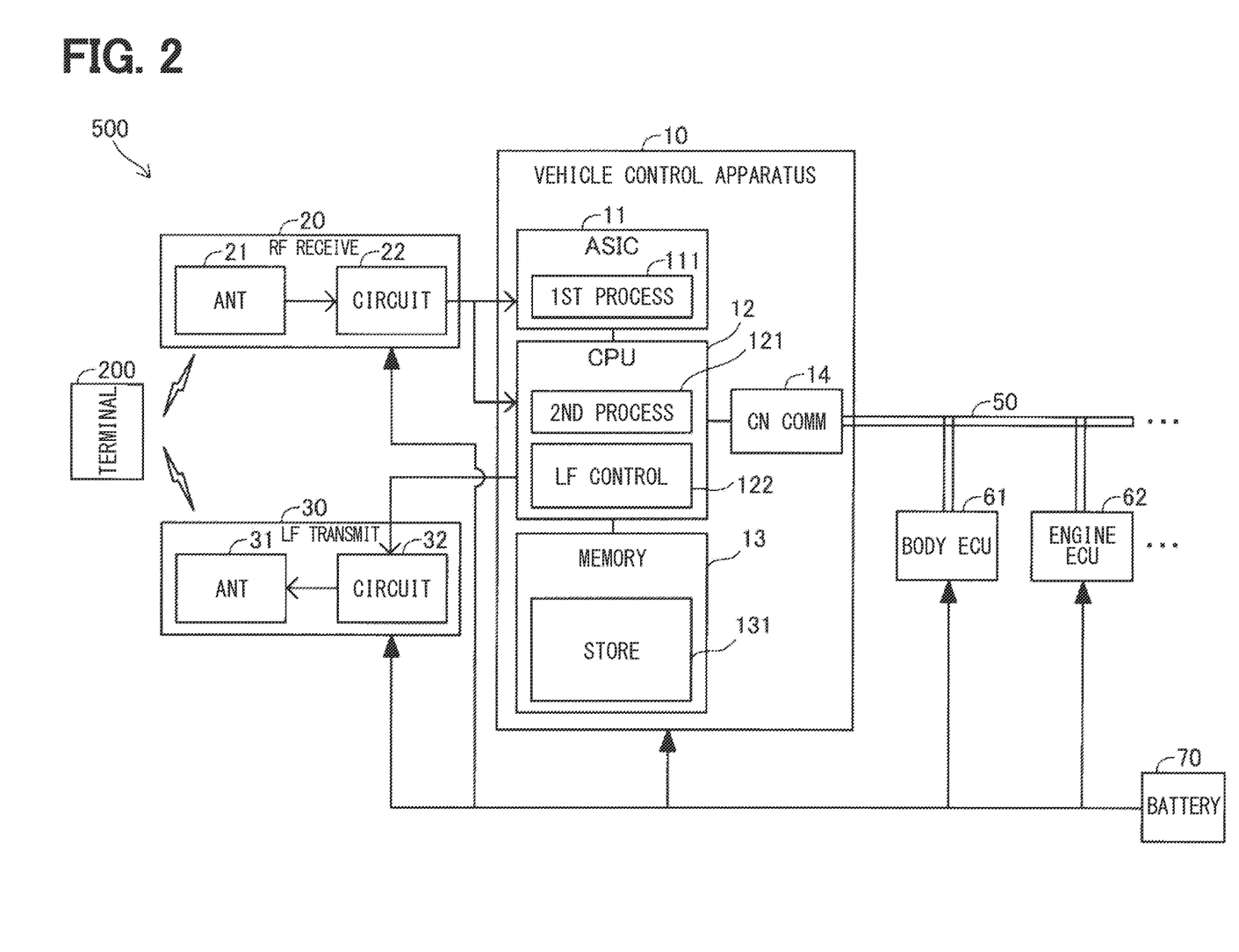
FIG. 2 is a block diagram showing a vehicle system according to the first embodiment.

As shown in FIG. 2, the vehicle control apparatus 10 is configured by an ECU (Electronic Control Unit) that includes an ASIC (Application Specific Integrated Circuit) 11, a CPU (Central Processing Unit) 12, a memory 13, and a CAN (Controller Area Network) communication unit 14.

The vehicle control apparatus 10 is connected to the RF receiver unit 20 and the LF transmitter unit 30, and performs wireless communication in the RF band and the LF band with the portable terminal 200.

The RF receiver unit 20 includes an RF antenna 21 and an RF receiver circuit 22. The RF receiver circuit 22 amplifies and encodes the RF signal received by the RF antenna 21, and outputs it as a digital signal. The encoding process by the RF receiver circuit 22 is performed with the above-mentioned bi-phase FSK system.

The LF transmitter unit 30 includes a plurality of LF antennas 31 and an LF transmitter circuit 32. As shown in FIG. 1, the LF antennas 31 are installed respectively at a plurality of positions in the vehicle 100. Specifically, they are installed in the driver's seat door, the passenger seat door, the left and right doors in the rear seat, and the rear gate, individually, as well as in the passenger compartment. The LF transmitter circuit 32 modulates and amplifies the digital signal output from the vehicle control apparatus 10, and transmits LF band electric waves via the LF antennas 31.

The vehicle control apparatus 10 is also connected to the CAN 50 and communicates with other ECUs connected to the CAN 50. FIG. 1 and FIG. 2 exemplify a body ECU 61 and an engine ECU 62 as other ECUs. The body ECU 61 controls the unlocking and locking of the door of the vehicle 100, the lighting state of various lamps such as a hazard lamp, and the like. The engine ECU 62 controls driving of the engine of the vehicle 100.

The ASIC 11 functions as a first processor 111. The first processor 111 executes a first process in RF signal reception handling process. Details of the RF signal reception handling process and the first process will be described later.

The CPU 12 functions as a second processor 121 and the LF signal transmission controller 122 by executing the control program stored in the memory 13 in advance. The second processor 121 executes a second process in the RF signal reception handling process described later. Details of the second process will be described later. The LF signal transmission controller 122 controls the transmission of the LF signal. Specifically, the transmission timing of the LF signal, the transmission period, generation of transmission data, and the like are performed.

The memory 13 includes a ROM (Read Only Memory) and a RAM (Random Access Memory). The control program described above is stored in the ROM. A vehicle-related information storage 131 is provided in the ROM. Vehicle-related information is stored in the vehicle-related information storage 131 in advance. The vehicle-related information is information related to the vehicle 100, and in the present embodiment, includes the identifier that can distinguish the vehicle 100 from other vehicles. In addition to such an identifier, the vehicle-related information includes any other information about the vehicle, such as information indicating a vehicle manufacturer, information indicating an engine model number, and information indicating an identifier capable of discriminating a user.

The CAN communication unit 14 controls communication via the CAN 50. As a result, the vehicle control apparatus 10 can exchange data with other ECUs. For example, the body ECU 61 can be instructed to blink the hazard lamp.

The vehicle control apparatus 10, the RF receiver unit 20, the LF transmitter unit 30, the body ECU 61, and the engine ECU 62 described above are each supplied with power from a battery 70 mounted on the vehicle 100. Among these, the vehicle control apparatus 10, the RF receiver unit 20, and the LF transmitter unit 30 are supplied with power from the battery 70 even while the vehicle 100 is parked. As a result, the vehicle control apparatus 10 can receive the RF signal and transmit the LF signal even while the vehicle 100 is parked. In the present embodiment, the operation mode of the CPU 12 is selectively switched to either the sleep mode or the normal mode. The sleep mode is an operation mode in which only a very small amount of processing such as switching of operation modes can be executed, and the power consumption is very low. On the other hand, the normal mode is an operation mode in which all the processes executable by the CPU 12 can be executed, and the power consumption is higher than that in the sleep mode. While the vehicle 100 is being parked, the operation mode of the CPU 12 is a sleep mode.

The vehicle control apparatus 10 having the above-described configuration executes an RF signal reception handling process described later. The RF signal reception handling process includes (i) determination of whether the received RF signal is a wireless signal transmitted from a portable terminal (hereinafter referred to as "regular wireless signal"); (ii) authentication of whether the received RF signal is a wireless signal transmitted from the portable terminal 200 which is a portable terminal for the vehicle 100; and (iii) processing for realizing the process according to the control content indicated by the wireless signal when authentication is successful. The above RF reception handling process is executed by the vehicle control apparatus 10. This can reduce the power consumption of the vehicle control apparatus 10 when receiving external noises in the RF band different from the regular wireless signal. This can prevent the battery exhaustion from occurring.

A2. RF Signal Reception Handling Process

Figure 3:
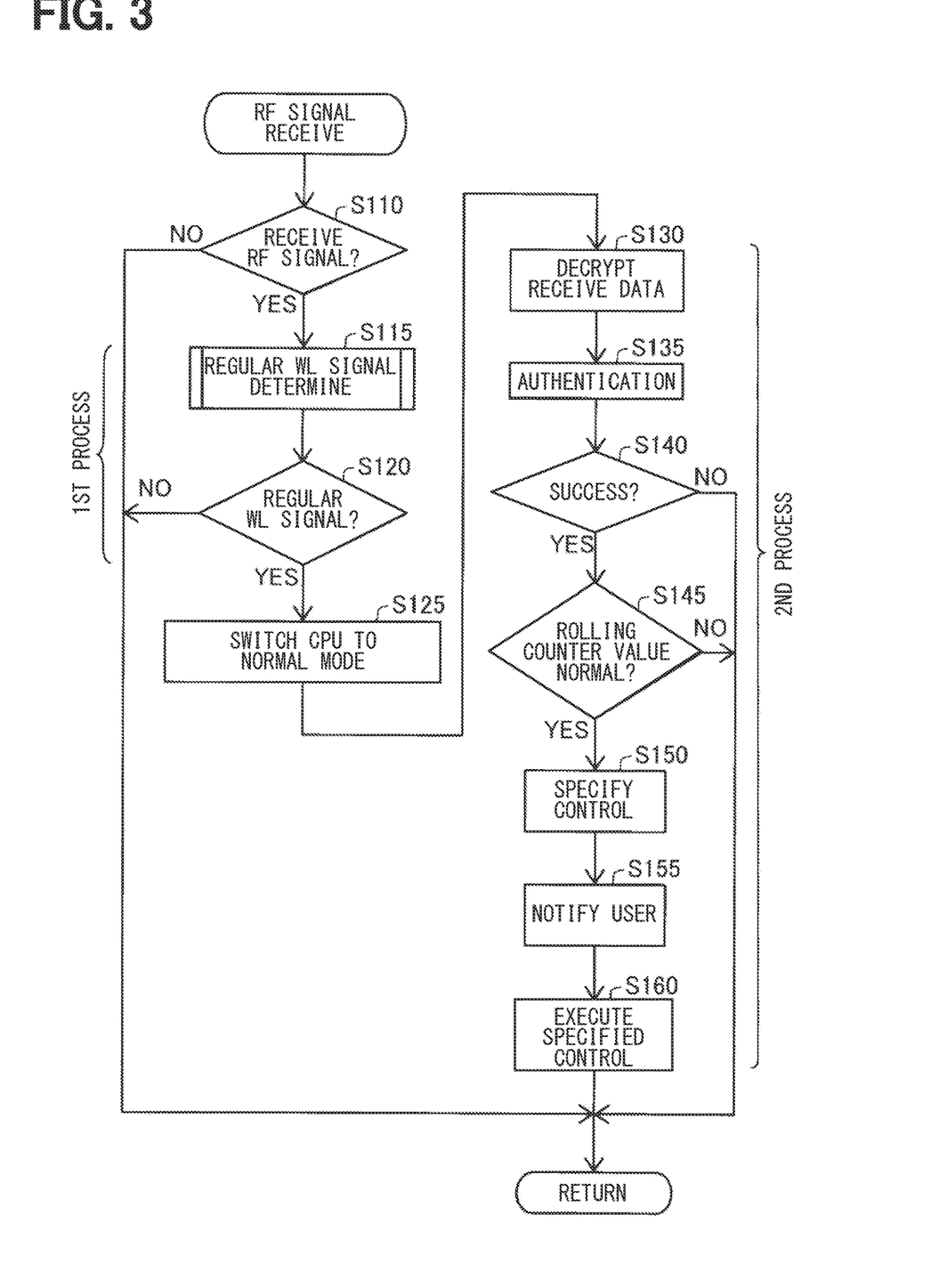
FIG. 3 is a flowchart showing steps of an RF signal reception handling process of the first embodiment.

The RF signal reception handling process shown in FIG. 3 is started when the vehicle 100 is shifted to a parking state. The parking state means a state in which the door of the vehicle 100 is being locked after the ignition of the vehicle 100 is switched from ON to OFF and the user holding the portable terminal 200 leaves the vehicle 100. The fact that the user left the vehicle 100 with the portable terminal 200 can be determined, for example, by transmitting LF signals from all the LF antennas 31 and not receiving RF signals within a predetermined time after transmitting.

The first processor 111 determines whether an RF signal is received via the RF receiver unit 20 (step S110). When it is determined that the RF signal is not received (step S110: NO), step S110 is executed again. That is, the first processor 111 waits until it receives the RF signal. The case of receiving the RF signal corresponds to (i) the case where the user holds the portable terminal 200, approaches the vehicle 100, presses the push button of the portable terminal 200, or (ii) the case where external noise in the RF band is received. Such external noise includes (i) a signal transmitted from portable terminals for other vehicle control apparatuses; (ii) a signal of wireless communication between a device installed in each parking space in a parking lot and a management apparatus for managing the parking lot; (iii) wireless waves output from various towers; and (iv) electromagnetic waves output from fluorescent lamps or broken neon signs.

When it is determined that the RF signal is received (step S110: YES), the first processor 111 executes a regular wireless signal determination process (step S115). Based on the result of the regular wireless signal determination process, it is determined whether the received RF signal is a regular wireless signal (step S120). In the present embodiment, steps S115 and S120 correspond to a first process and a determination process in the present disclosure.

Figure 4:
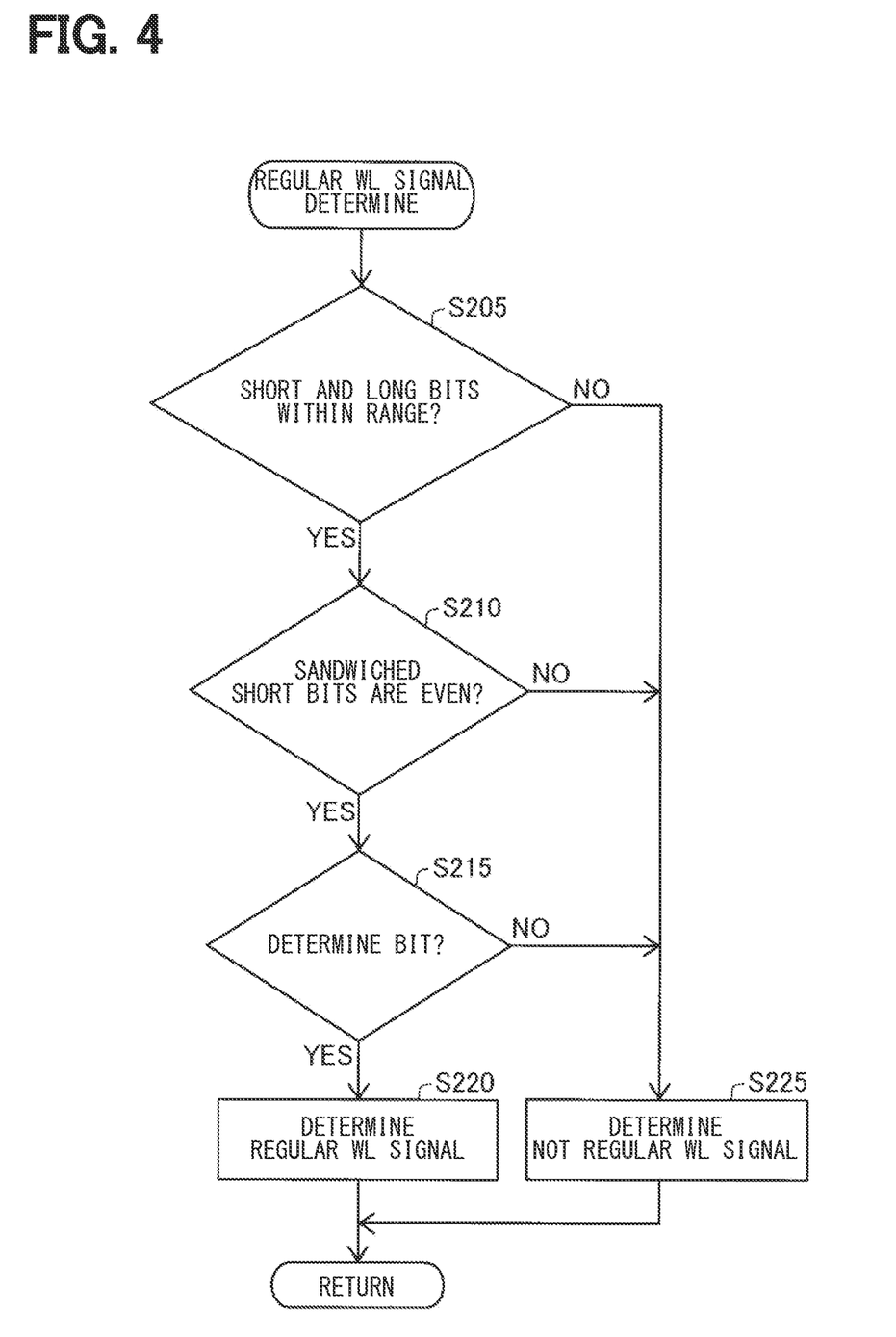
FIG. 4 is a flowchart showing steps of a determination process for a regular wireless signal.

As shown in FIG. 4, in the regular wireless signal determination process, the first processor 111 determines whether the time lengths of the short bit and the long bit sampled from the received RF signal are both within a predetermined time range (step S205). The sampled short bits and long bits may be all the short bits and long bits received within a predetermined time from the start of receiving the RF signal. Further, the sampled short bits and long bits may be a predetermined number of short bits and long bits received at optional timing. As shown in FIG. 5, a regular wireless signal is adjusted and output so that the long bit time length TL and the short bit time length TS are each within a predetermined time range. For example, the long bit time length TL may be 0.7 microseconds and the short bit time length TS may be 0.35 microseconds. On the other hand, in the case of external noise, the time length of the long bit or the short bit may deviate from such a predetermined time range. Further, even for a regular wireless signal, the time length of the long bit or the short bit may deviate from the predetermined time range depending on the surrounding communication environment such as the size and type of the interception. In the present embodiment, the predetermined time range is set as a limit value that is a value obtained by increasing or decreasing the design value of the time length of each of the long bit and the short bit by a predetermined ratio. In the present embodiment, the predetermined ratio is 30%. It is assumed that various interceptions exist between the vehicle 100 and the portable terminal 200. Therefore, the time lengths of the long bit and the short bit may deviate significantly from the design values even in a regular wireless signal. Therefore, in order to correctly determine that the signal is a regular wireless signal, a relatively large value of 30% is set as the predetermined ratio. The above-mentioned predetermined ratio is not limited to 30% and may be any ratio of 0% or more.

When it is determined that the time lengths of the short bit and the long bit are both within the predetermined time range (step S205: YES), it is determined whether the number (i.e., a counted number) of short bits sandwiched between two adjacent long bits is an even number (step S210). In the signal obtained by the bi-phase FSK encoding process, the number of short bits sandwiched between two adjacent long bits is an even number. For example, as shown in FIG. 5, the short bits sandwiched between the long bit "1" from time t2 to t4 and the long bit "1" from time t8 to t10 is four from (a) to (d). Since the regular wireless signal is modulated by the bi-phase FSK system, the number of short bits sandwiched between two adjacent long bits in the digital signal obtained by encoding is an even number. On the other hand, external noise is not typically modulated by the bi-phase FSK system. Therefore, in the digital signal obtained by encoding such a signal, in many cases, two types of bits (i.e., a long bit and a short bit) are not present, or the number of short bits sandwiched between two adjacent long bits is an odd number. However, it is still possible that the external noise happens to have long bits and short bits, and the number of short bits sandwiched between two adjacent long bits may be an even number. In the present embodiment, the determination in step S210 is performed for all the two long bits adjacent to each other existing within the range of 9 bits in total. In other words, it is determined whether the number of short bits sandwiched by each pair of all the pairs of two adjacent long bits within a total of 9 bits is an even number (step S210). The 9 bits here mean 9 cycles of bits when counted in a code 1 bit cycle. Note that step S210 may be performed not only for 9 bits but for all adjacent long bits existing within an optional range of an optional number of bits other than 9 bits (i.e., within an optional bit width including an optional number of bits other than 9 bits).

As illustrated in FIG. 4, when it is determined that the number of short bits sandwiched between two long bits adjacent to each other is an even number (step S210: YES), the first processor 111 determines whether the determination bit exists within a predetermined bit width including a predetermined number of bits (step S215). The RF signal transmitted from the portable terminal 200 includes a determination bit for each predetermined bit width including a predetermined number of bits. The determination bit is a bit set to specify that the RF signal is an RF signal output from the portable terminal, and is set for each predetermined bit width including a predetermined number of bits. Note that, if the RF signal transmitted from the portable terminal 200 includes a determination bit for each predetermined first bit width including a predetermined first number of bits, the first processor 111 may determine in step S215 whether the determination bit exists within a predetermined second bit width including a predetermined second number of bits that is equal to or larger than the first number of bits included in the first bit width.

In this embodiment, a predetermined number of consecutive "1"s are used as set determination bits. The predetermined number is 5, but it is not limited to 5 and may be any number of 2 or more. Further, in the present embodiment, the predetermined bit width includes 64 bits (64 cycles) in the code 1 bit cycle, but it is not limited to 64 bits and may be any bit width including any number of bits larger than a predetermined number of consecutive "1 s".

When it is determined that the set determination bits exist within the predetermined bit width (step S215: YES), the first processor 111 determines that the received RF signal is a regular wireless signal (step S220).

On the other hand, the first processor 111 determines that the received RF signal is not a regular wireless signal (step S225) in the followings cases: when it is determined in the above step S205 that at least one of (i) the time length of the short bit and (ii) the time length of the long bit is not within the predetermined time range (step S205: NO); when it is determined in step S210 described above that the number of short bits sandwiched between two adjacent long bits is not an even number (step S210: NO); or when it is determined in step S215 described above that the set determination bits do not exist within the predetermined bit width (step S220: NO). After step S225 and step S220, step S120 described above shown in FIG. 3 is executed.

The above step S205 corresponds to a second sub determination process in the present disclosure. Further, step S210 corresponds to a first sub determination process of the present disclosure. Step S215 corresponds to a third sub determination process of the present disclosure.

As shown in FIG. 3, when it is determined in step S120 that the received RF signal is not a regular wireless signal (step S120: NO), the process returns to step S110. On the other hand, when it is determined that the received RF signal is a regular wireless signal (step S120: YES), the mode switching function unit (not shown) of the CPU 12 switches the operation mode of the CPU 12 from the sleep mode to the normal mode (step S125). When the CPU 12 switches to the normal mode, the vehicle control apparatus 10 starts regular communication with the other ECUs 61, 62 and the like via the CAN 50. As a result, the power consumption of the CPU 12 sharply increases and the power consumption of the other ECUs 61, 62, etc. sharply increases, so that the power consumption of the vehicle 100 as a whole sharply increases.

After the execution of step S125, the second processor 121 executes a second process. As described later, the second process includes a process including authentication (step S135 described later) of whether the portable terminal that is the transmission source of the received RF signal is the portable terminal 200 for the vehicle 100. The power consumption of the CPU 12 when executing such authentication is high. Therefore, the total power consumption of the vehicle control apparatus 10 by the second process is larger than the total power consumption of the vehicle control apparatus 10 by the first process described above. In the above-described first process, when it is determined that the received signal is not a regular wireless signal (step S120: NO), the second process is not executed and the process returns to step S110. Therefore, the power consumption of the battery 70 can be suppressed as compared with the configuration in which the second process is executed when a signal that is not a regular wireless signal is received.

In the second process, first, the second processor 121 decrypts the received data (step S130). The second processor 121 executes an authentication process based on the decrypted received data (step S135). In the present embodiment, the vehicle-related information included in the received RF signal is compared with the vehicle-related information stored in the vehicle-related information storage 131. When both match, it is determined that the authentication is successful (i.e., has succeeded). When both do not match, it is determined that the authentication is unsuccessful (i.e., has failed). Note that the vehicle-related information included in the received data may not completely match the vehicle-related information stored in the vehicle-related information storage 131. Even in such a case, if the difference between the two is within a predetermined range, it may be determined that the authentication has succeeded, and if the difference is not within the range, it may be determined that the authentication has failed.

The second processor 121 determines whether the authentication has succeeded based on the result of the authentication process of step S135 (step S140). When it is determined that the authentication has not succeeded (step S140: NO), the process returns to step S110. On the other hand, when it is determined that the authentication has succeeded (step S140: YES), the second processor 121 determines whether the value of the rolling counter is normal (step S145). The portable terminal 200 increments a rolling counter by one each time a push switch (not shown) is pressed, and includes the value of the counter in the RF signal and transmits the RF signal to the vehicle control apparatus 10. In the vehicle control apparatus 10, the second processor 121 also has a rolling counter, and increments the counter value each time the RF signal is received from the portable terminal 200. If there is no malfunction in the RF communication between the portable terminal 200 and the vehicle control apparatus 10, the value of the rolling counter included in the RF signal transmitted by the portable terminal 200 and the value of the rolling counter included in the second processor 121 should agree with each other. Therefore, in step S145, the second processor 121 determines whether the rolling counter value included in the received RF signal matches the value of the rolling counter included in itself. If they match, it is determined that the rolling counter value is normal. If they do not match, it is determined that the rolling counter value is not normal. The case where the rolling counter values do not match is assumed to be, for example, a case where a malfunction occurs in the configuration for transmitting the RF signal in the portable terminal 200.

When it is determined that the value of the rolling counter is not normal (step S145: NO), the process returns to step S110 described above. On the other hand, when it is determined that the value of the rolling counter is normal (step S145: YES), the second processor 121 specifies the control content designated in the RF signal (step S150). The control content specified in the RF signal means the control content instructed to the vehicle control apparatus 10 by operating the push switch included in the portable terminal 200. For example, unlocking all doors, opening rear seat doors, opening a back hatch, and so on.

The second processor 121 notifies that the user's operation has been accepted (step S155). Specifically, the second processor 121 notifies the user that the operation has been accepted by transmitting a command to the body ECU 61 and performing a so-called answer-back operation in which the hazard lamp blinks. Instead of blinking the hazard lamp, or in addition to blinking the hazard lamp, a predetermined sound may be output from a speaker or a horn to notify that the user's operation is accepted.

The second processor 121 executes the control specified in step S150 (step S160). For example, when unlocking the doors of the driver's seat is specified, a command is sent to the body ECU 61 to unlock all the doors. After execution of step S160, the process returns to step S110 described above.

The vehicle control apparatus 10 of the first embodiment described above is provided as follows. When it is determined that the RF signal received by the first process is not a regular wireless signal, the second process including the authentication of the portable terminal 200 (step S135) is not executed. Here, the power consumption of the vehicle control apparatus 10 when executing the first process is smaller than the power consumption of the vehicle control apparatus 10 when executing the second process. The power consumption of the vehicle control apparatus 10 can thus be suppressed as compared with each of (i) the configuration in which the second process is always executed instead of the first process and (ii) the configuration in which the first process and the second process are always executed. Therefore, even if power is supplied to the vehicle control apparatus 10 from the battery 70, it is possible to prevent the battery exhaustion from occurring.

Further, the vehicle-related information included in the received RF signal is compared with the vehicle-related information stored in the vehicle-related information storage 131. Then, when there is a difference outside a predetermined range, it is determined that the authentication of the portable terminal 200 has failed. If there is no difference outside the predetermined range, it is determined that the authentication of the portable terminal 200 has succeeded. Therefore, the portable terminal 200 can be accurately authenticated.

Further, since the first processor 111 is configured by the ASIC 11 and the second processor 121 is configured by the CPU 12, the power consumption of the first processor 111 can be reduced more easily than the power consumption of the second processor 121.

Further, the received RF signal is encoded by the bi-phase FSK system which is a predetermined encoding process corresponding to the modulation process in the portable terminal 200. In addition, in the regular wireless signal determination process, the number of short bits sandwiched between two adjacent long bits in the received RF signal is counted or determined. When the counted or determined number of short bits between two adjacent long bits is an even number, the RF signal is determined to be a regular wireless signal. When an odd number, the RF signal is not determined to be a regular wireless signal. Therefore, it is possible to accurately determine whether the received RF signal is a regular wireless signal, that is, whether the received wireless signal is a wireless signal transmitted from a portable terminal. The "portable terminal" here is not limited to the portable terminal 200, and means any device having the same function as the portable terminal 200 and used as an electronic key for another vehicle.

Further, if YES is determined in all the determination processes of steps S205, S210, and S215, it is determined that the RF signal is a regular wireless signal. If NO is determined in at least one of the determination processes of steps S205, S210, and S215, it is determined that the RF signal is not a regular wireless signal. Therefore, it is possible to accurately determine whether the received RF signal is a regular wireless signal.

If it is determined in step S205 that at least one of the time length of the short bit and the time length of the long bit is not within the predetermined time range, it is determined that the received RF signal is not a regular wireless signal. Then, the regular wireless signal determination process ends. In this case, step S210 having a relatively large processing load is not executed. Therefore, the power consumption by the ASIC 11 can be suppressed and the time required for the regular wireless signal determination process can be shortened as compared with the configuration in which step S210 is always executed regardless of the time lengths of the short bit and the long bit.

Further, in the portable terminal 200 and the vehicle control apparatus 10, the bi-phase FSK system is adopted as a modulation and encoding system in wireless communication in the RF band. Therefore, in step S210 of the regular wireless signal determination process, it is possible to accurately determine whether the received RF signal is a regular wireless signal.

B. Second Embodiment

Figure 6:
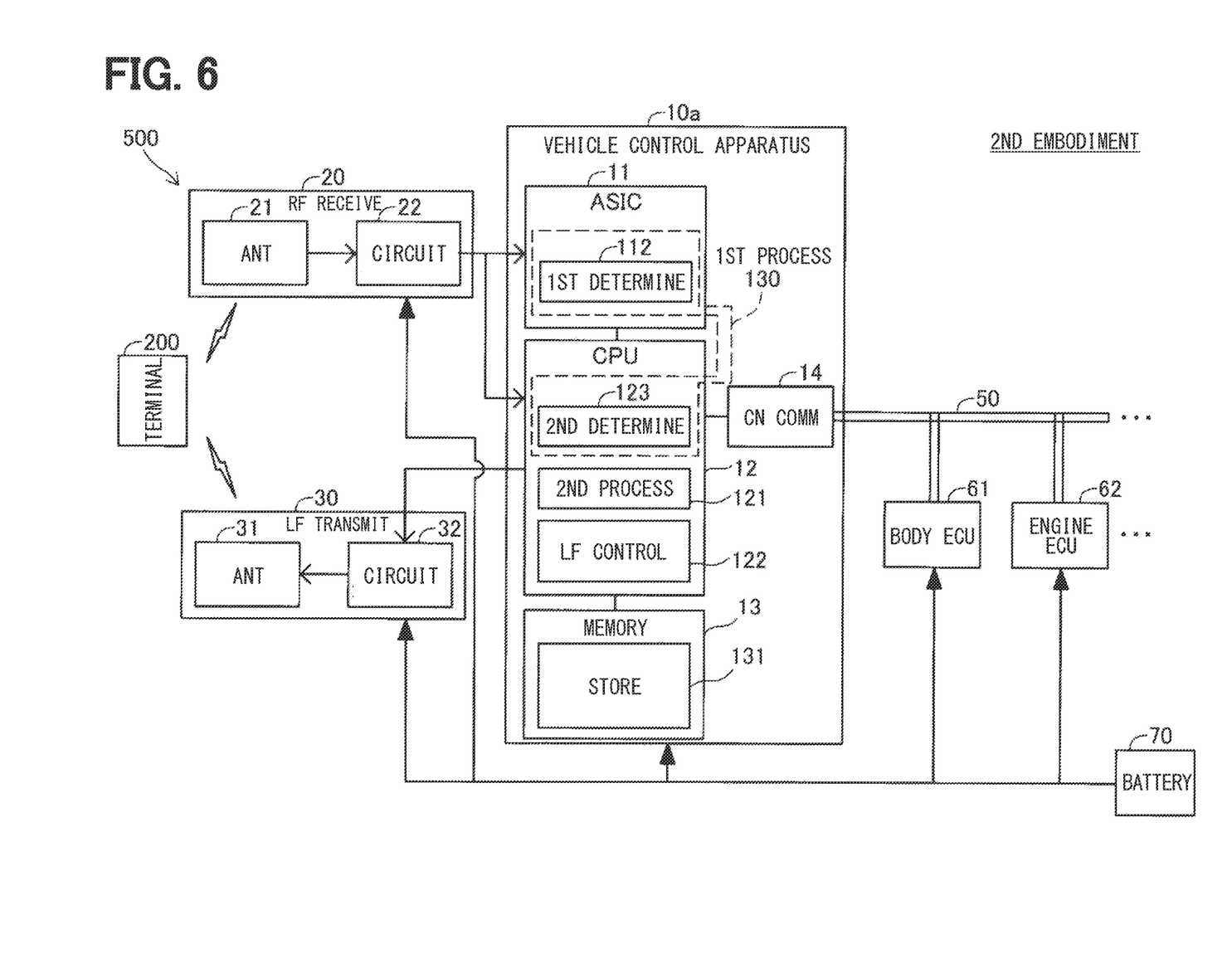
FIG. 6 is a block diagram showing a detailed configuration of a vehicle system according to a second embodiment.

The vehicle control apparatus 10a according to a second embodiment shown in FIG. 6 is different from the vehicle control apparatus 10 according to the first embodiment shown in FIG. 2 in that it includes a first processor 130 instead of the first processor 111. Since the other configurations of the vehicle control apparatus 10a of the second embodiment are the same as those of the vehicle control apparatus 10 of the first embodiment, the same elements are designated by the same reference signs, and detailed description thereof will be omitted. The first processor 130 executes a first process. Similar to the first process in the first embodiment, the first process is a process of determining whether the received RF signal is a regular wireless signal. However, as will be described later, the steps of the first process of the second embodiment is slightly different from the steps of the first process of the first embodiment.

In the second embodiment, the first processor 130 includes a first determination unit 112 and a second determination unit 123. In the second embodiment, the ASIC 11 functions as the first determination unit 112 instead of functioning as the first processor 111. The CPU 12 also functions as a second determination unit 123 in addition to the above-described second processor 121 and LF signal transmission controller 122. The processing contents executed by the first determination unit 112 and the second determination unit 123 will be described later. In the second embodiment, the normal mode of the CPU 12 includes a low speed mode and a high speed mode. The low speed mode is the same as the high speed mode in that the CPU 12 can execute all executable functions. However, the low speed mode differs from the high speed mode in that the CPU 12 operates at a lower frequency. In the low speed mode, the power consumption of the CPU 12 is smaller than that in the high speed mode.

Figure 7:
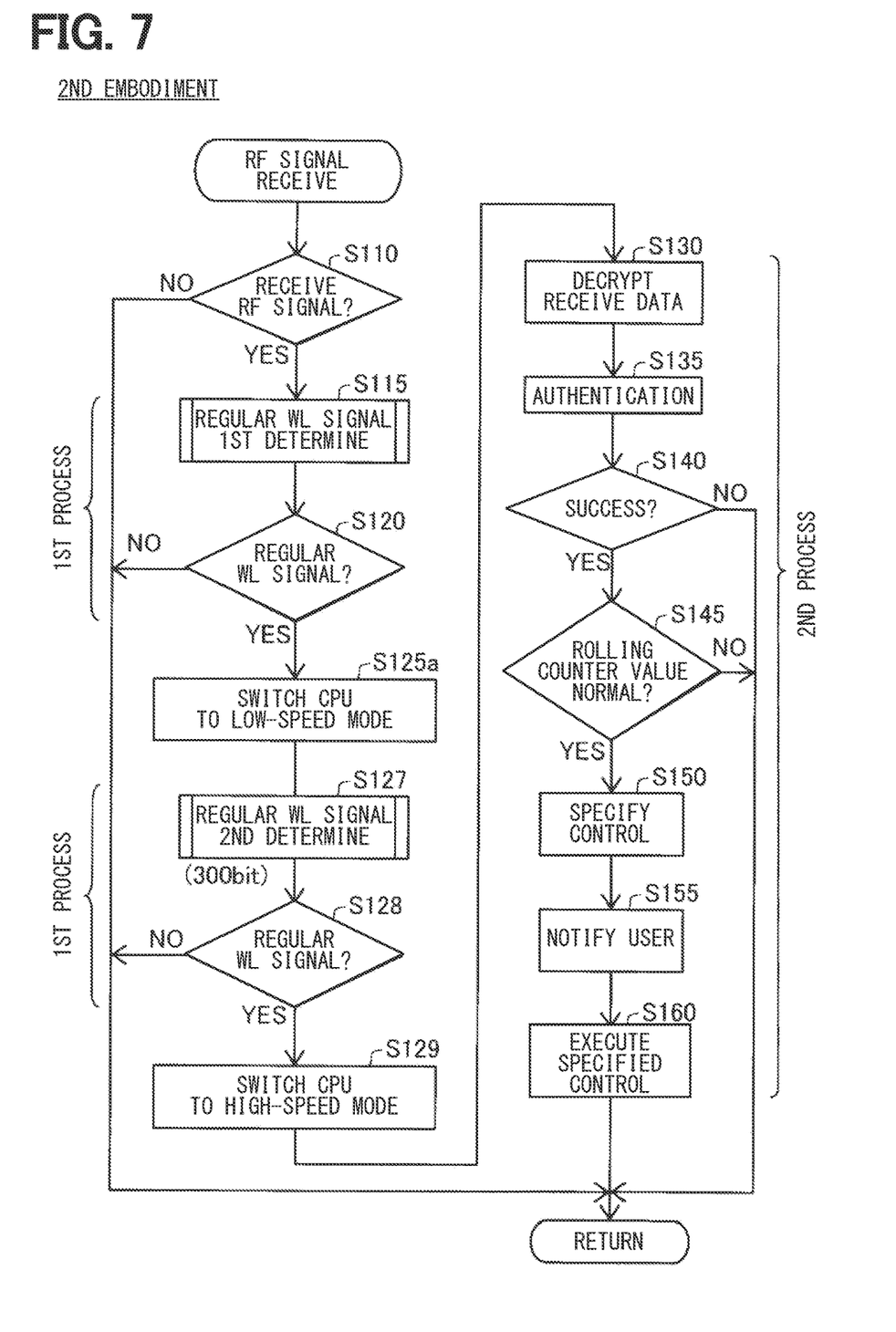
FIG. 7 is a flowchart showing steps of a RF signal reception handling process according to the second embodiment.

The RF signal reception handling process of the second embodiment shown in FIG. 7 is different from the RF signal reception handling process of the first embodiment shown in FIG. 3 in that step S125a is executed in place of step S125, and steps S127, S128 and S129 are additionally executed. The other steps in the RF signal reception handling process of the second embodiment are the same as the RF signal reception handling process of the first embodiment. Therefore, the same steps are denoted by the same reference signs, and detailed description thereof will be omitted. Note that in the second embodiment, the process of step S115 is referred to as a "regular wireless signal first determination process", although the process of step S115 in the second embodiment is the same as the regular wireless signal determination process of step S115 in the first embodiment. This is for distinguishing from the regular wireless signal second determination process described later. The first determination unit 112 executes this regular wireless signal first determination process.

When it is determined in step S120 that the RF signal is a regular wireless signal (step S120: YES), the mode switching function unit (not shown) included in the CPU 12 switches the operation mode of the CPU 12 from the sleep mode to the low speed mode (step S125a).

After the operation mode of the CPU 12 is switched to the low speed mode, the second determination unit 123 executes the regular wireless signal second determination process (step S127). The regular wireless signal second determination process is a process of determining whether the received RF signal is a regular wireless signal, as in the regular wireless signal first determination process.

Figure 8:
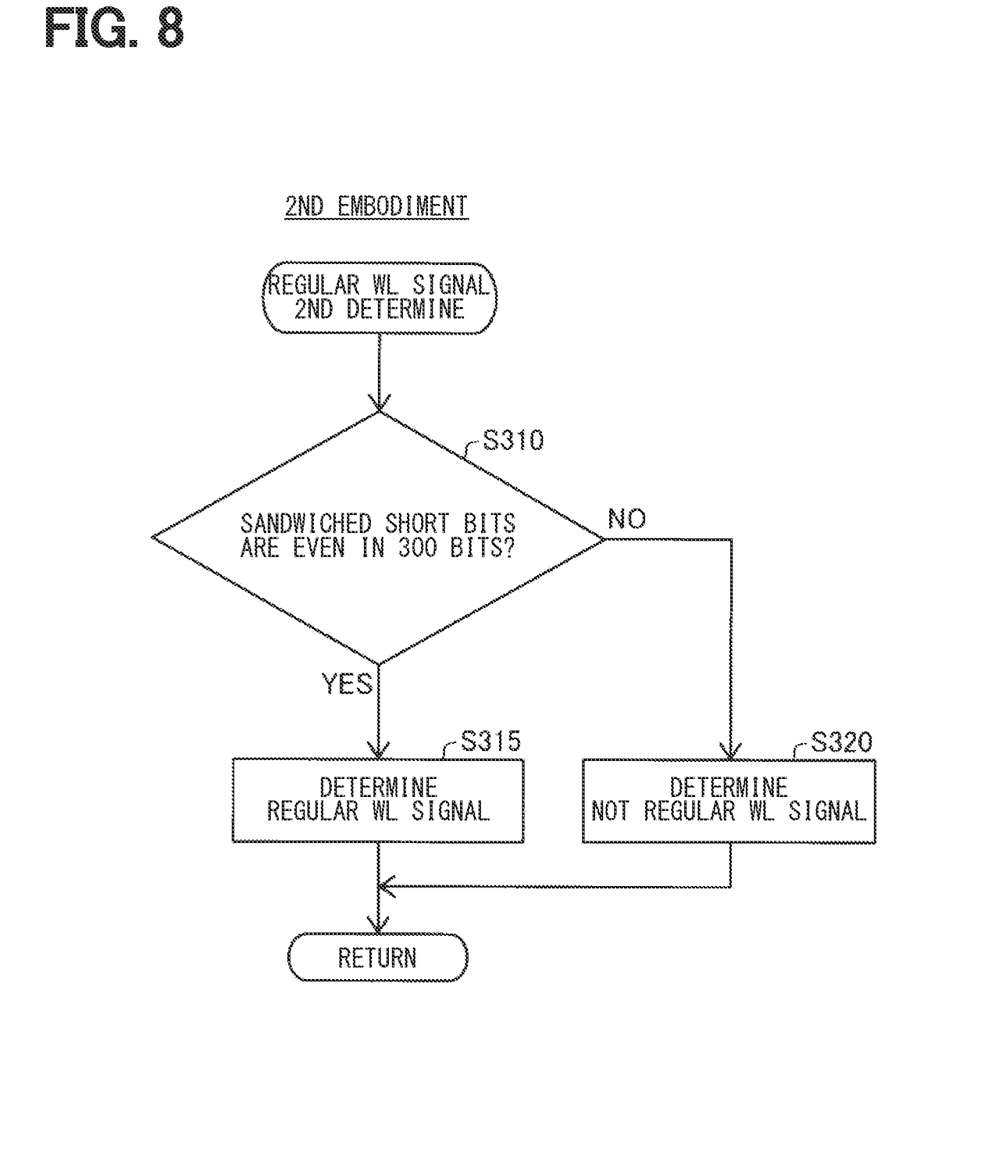
FIG. 8 is a flowchart showing steps of a second determination process for a regular wireless signal according to the second embodiment.

As shown in FIG. 8, in the regular wireless signal second determination process, the second determination unit 123 determines whether the number of short bits sandwiched by each pair of two long bits adjacent to each other among all the pairs of two long bits adjacent to each other within a total of 300 bits is an even number (Step S310). Then, when it is determined that the number of short bits sandwiched by each pair of all the pairs of two adjacent long bits within the total of 300 bits is an even number (step S310: YES), the second determination unit 123 determines that the received RF signal is a regular wireless signal (Step S315). On the other hand, when it is determined that the number of short bits sandwiched by any one pair of all the pairs of two adjacent long bits within the total of 300 bits is not an even number (step S310: NO), the second determination unit 123 determines that the received RF signal is not a regular wireless signal (step S320). As described above, the regular wireless signal second determination process is different from step S210 of the regular wireless signal first determination process only in that the amount of data as a determination target is large. In step S210 in the regular wireless signal first determination process (i.e., the regular wireless signal determination process), the determination target was all two long bits adjacent to each other existing within the range of 9 bits in total. In contrast, as described above, in the regular wireless signal second determination process, the determination target is all two long bits adjacent to each other that are present in the range of 300 bits in total. It should be noted that the range of 300 bits in total may be replaced by a range of optional bits larger than 9 bits. The range of 9 bits in total in step S210 may be also referred to as a predetermined first bit width including a predetermined first number of bits, whereas the range of 300 bits in total in step S310 may be also referred to as a predetermined second bit width including a predetermined second number of bits.

Since the data amount of determination target in step S210 is relatively small, the circuit scale of the first determination unit 112, that is, the ASIC 11 can be configured to be relatively small. On the other hand, since the data amount of determination target is relatively small, the determination accuracy is relatively low. On the other hand, the second determination unit 123 (i.e., the CPU 12) can perform a process for a large amount of data without significantly changing the configuration. Then, the determination accuracy can be made relatively high by performing the determination on such a large data amount. As described above, in the second embodiment, it is possible to suppress the increase in the circuit scale of the ASIC 11 while improving the determination accuracy. Note that the power consumption of the CPU 12 when executing steps S127 and S128 is smaller than the power consumption of the CPU 12 when executing the second process including the authentication process (step S135).

As shown in FIG. 7, after execution of step S127, the second determination unit 123 determines whether the received RF signal is a regular wireless signal based on the result of the regular wireless signal second determination process (Step S128). When it is determined that the signal is a regular wireless signal (step S128: YES), the mode switching function unit (not shown) of the CPU 12 switches the operation mode of the CPU 12 from the low speed mode to the high speed mode (step S129). After the operation mode of the CPU 12 is switched to the high speed mode, the processing after step S130 described above, that is, the second process is executed. Therefore, in the second embodiment, the second process is executed in a situation where the operation mode of the CPU 12 is the high speed mode.

When it is determined in step S128 that the signal is not a regular wireless signal (step S128: NO), the process returns to step S110. Therefore, in this case, the second process is not executed. In the second embodiment, steps S115, S120, S127 and S128 correspond to a first process in the present disclosure.

The vehicle control apparatus 10a of the second embodiment described above has the same effects as the vehicle control apparatus 10 of the first embodiment. In addition, the vehicle control apparatus 10a of the second embodiment performs (i) the determination process performed by the ASIC 11 (i.e., the first determination unit 112) for each 9 bits in total, and (ii) the determination process by the second determination unit 123 by the CPU 12 in the low speed mode for every 300 bits in total. Therefore, it is possible to perform the determination with higher accuracy as compared with the configuration in which only the determination process is executed by the ASIC 11 every 9 bits in total. Further, the processing load of the ASIC 11 can be reduced, and the circuit scale of the ASIC 11 can be suppressed from being extremely large, as compared with the configuration in which the determination process is executed by the ASIC 11 every 300 bits in total.

C. Other Embodiments (C1) In each of the embodiments, the portable terminal 200 is an electronic key for the vehicle 100 that is carried by a user and used, but the present disclosure is not limited to this. For example, any device capable of wireless communication may be used as the portable terminal 200. Specifically, a portable phone device such as a so-called smartphone may be used as a portable terminal 200. In this configuration, an application program for functioning as an electronic key for the vehicle 100 and an application for executing the process of the present disclosure are installed in advance in the portable phone device. The portable phone device may thus be operated as a portable terminal 200 by activating and executing these applications.

(C2) In each of the embodiments, in the authentication process (step S135), the vehicle-related information included in the received RF signal is compared with the vehicle-related information stored in the vehicle-related information storage 131. Then, if there is a difference outside a predetermined range, it is determined that the authentication of the portable terminal 200 has failed. If there is no difference outside the predetermined range, it is determined that the authentication of the portable terminal 200 has succeeded. However, the present disclosure is not limited to this. For example, a common secret key may be set in advance for the portable terminal 200 and the vehicle control apparatuses 10 and 10a, and the portable terminal 200 may encrypt the transmission data using the secret key. The vehicle control apparatus 10 and 10a may determine that the authentication is successful when the received data can be decrypted with the secret key, and may determine that the authentication is unsuccessful when the received data cannot be decrypted with the secret key.

(C3) In each of the embodiments, at least a part of the first process is executed by the ASIC 11, but instead of this, all of the first process may be executed by the CPU 12. For example, in the first embodiment, the CPU 12 may be configured to function as a functional unit that executes the first process, and the first process may be executed in the low speed mode. Further, in this configuration, a step of "switching the operation mode of the CPU 12 from the sleep mode to the low speed mode" may be added between step S110 and step S115. Then, in step S125, the operation mode of the CPU 12 is switched from the low speed mode to the high speed mode. Also in such a configuration, the power consumption of the vehicle control apparatus 10 when executing the first process can be made smaller than the power consumption of the vehicle control apparatus 10 when executing the second process.

(C4) In the second embodiment, the operation mode of the CPU 12 when executing steps S127 and S128 is the low speed mode, but may be the high speed mode. In such a configuration, in step S125a, the operation mode of the CPU 12 may be switched from the sleep mode to the high speed mode, and step S129 may be omitted. Even in such a configuration, when the received RF signal is not a regular wireless signal, the operation mode of the CPU 12 remains in the sleep mode, and the regular wireless signal second determination process is not executed. The power consumption can thus be suppressed.

(C5) The regular wireless signal determination process of the first embodiment and the regular wireless signal first determination process of the second embodiment include three determination processes of steps S205, S210, and S215. However, the determination process of one or two of them may be omitted. Further, the order of these three determination processes may be exchanged. Further, in the case where the determination results of all of steps S205, S210, S215 are YES, step S220 is executed. In the case where the determination result of any one of steps S205, S210, S215 is NO, step S225 is executed. However, the present disclosure is not limited thereto. For instance, For instance, in the case where the determination result of any one of steps S205, S210, S215 is YES, step S220 may be executed. In the case where the determination results of all of steps S205, S210, S215 are NO, step S225 may be executed. In addition, in each embodiment, another process may be added to the first process and executed.

(C6) In each of the embodiments, at least one step in the second process (steps S130 to S160) may be omitted or replaced with another step. For example, in step S155, the notification that the user operation is received may be omitted. Alternatively, the history of the user operation may be stored in the memory 13 instead of executing the notification that the user operation is received. Further, for example, a parity check of the received data may be added and executed. In such a configuration, the portable terminal 200 adds a parity bit for each predetermined bit width and transmits the RF signal.

(C7) In each of the embodiments, the portable terminal 200 and the vehicle control apparatus 10 adopt the bi-phase FSK system as a modulation and encoding process in wireless communication in the RF band. However, the present disclosure is not limited thereto. Another configuration may be provided to adopt an optional encoding process in which two consecutive short bits represent 0 and one long bit represents 1 and an optional modulation process corresponding to such an encoding process. For example, CMI (Code Mark Inversion code) may be adopted as an encoding process.

(C8) In the above-described embodiment, a part of the configuration implemented by hardware or hardware circuitry may be replaced with software, and conversely, a part of the configuration implemented by software may be replaced with hardware or hardware circuitry. For example, the LF signal transmission controller may be realized by an integrated circuit, a discrete circuit, or a module combining these circuits. Further, when partial or all of the functions in the present disclosure is implemented by software, the software, that is, the computer program can be provided as the computer program itself or can be provided as a computer-readable non-transitory storage medium that stores the computer program. The computer-readable non-transitory storage medium is not limited to a portable storage medium, such as a flexible disk or a CD-ROM, but also includes an internal storage device, such as RAM or ROM included in the computer. The computer-readable non-transitory storage medium also includes a hard disk which is connected to the computer as an external storage device. That is, the computer-readable non-transitory storage medium has a broad meaning including any storage medium in which data can be stored in fixed manner but not temporarily.

The present disclosure should not be limited to the embodiments described above, and various other embodiments may be implemented without departing from the scope of the present disclosure. For example, the technical features in each embodiment may be used to solve some or all of the above-described issues or to provide one of the above-described effects. In order to achieve a part or all, replacement or combination can be appropriately performed. Also, some of the technical features may be omitted as appropriate.

For reference to further explain features of the present disclosure, the description is added as follows.

Vehicle control apparatuses mounted on vehicles may include a vehicle control apparatus that wirelessly communicates with a portable terminal carried by a user of the vehicle to realize a smart entry function or a remote keyless entry function. The smart entry function means a function of unlocking the door of the vehicle when the portable terminal enters a wireless communication area near the vehicle. Further, the remote keyless entry means a function of locking or unlocking the door of the vehicle according to the operation of the switch of the portable terminal. Generally, such a vehicle control apparatus, which may also be called an in-vehicle apparatus, can receive a signal in an RF band (for example, 300 MHz to 400 MHz) transmitted from a portable terminal, and can transmit a signal in an LF band (for example, 30 kHz to 300 kHz) to the portable terminal. The vehicle control apparatus is configured as a computer including a CPU, a ROM, and a RAM. Upon receiving a signal in the RF band from a portable terminal, the vehicle control apparatus may authenticate whether the portable terminal of a transmission source is an authorized portable terminal carried by the user of the vehicle based on the information such as the ID indicated by the signal.

There may be various types of interceptions between the vehicle control apparatus and the portable terminal. The characteristics of the RF band radio signal output from the portable terminal may thus change. This leads to setting relatively loosely the reference value (e.g., the reference value range of the time width of L (High) or L (Low) of the signal) for determining whether or not the transmission source of the wireless signal is a portable terminal. Vehicles may be parked in various places. Therefore, the vehicle control apparatus may receive various external noises, that is, signals in the RF band output from a device different from a regular portable terminal. Such an external noise may include a signal transmitted from a portable terminal for another vehicle control apparatus, a signal of wireless communication between a management apparatus and a device installed in each parking space in the parking lot, or wireless waves output from various radio towers. As mentioned above, the reference value for authentication is set relatively loosely. In some cases, external noise may thus be determined to be a signal output from a portable terminal. In this case, whether or not the signal transmission source is a regular portable terminal for the vehicle is authenticated based on the ID and the like indicated by the wireless signal. However, such authentication fails because of being external noise. In this way, useless authentication may have been performed for external noise. This poses an issue that the power consumption of the CPU that executes such authentication unnecessarily increases. In addition, the CPU waits in sleep mode during parking, and returns from sleep mode to normal mode when performing authentication. In this configuration, the restored CPU performs the authentication process and starts periodical communication with another vehicle control apparatus via the network in the vehicle. This will increase the CPU power consumption in not only the corresponding vehicle control apparatus but also other vehicle control apparatuses.

As described above, the power consumption of the CPU is increased when the wireless signal is received. This results in an issue posing a so-called "battery exhaustion" in which the charge amount of the battery that supplies power to the vehicle control apparatus is reduced and the battery cannot supply the power. Such an issue also applies to a configuration in which authentication is performed by an integrated circuit such as an ASIC instead of the CPU. It is thus desired to provide a technique capable of suppressing the battery exhaustion due to the power consumption caused by the processing of the vehicle control apparatus when the wireless signal is received.

An aspect of the present disclosure described herein is set forth in the following clauses.

According to an aspect of the present disclosure, a vehicle control apparatus is mounted on a vehicle to perform wireless communication with a portable terminal carried by a user of the vehicle, and control at least a part of functions of the vehicle according to an instruction from the portable terminal. The vehicle control apparatus includes a first processor and a second processor. The first processor is configured to execute a first process including a determination process configured to determine whether or not a wireless signal received by an antenna mounted on the vehicle is a regular wireless signal transmitted from the portable terminal. The second processor is configured to (i) execute a second process including an authentication of the portable terminal in response to the received wireless signal being determined to be the regular wireless signal due to the first process being executed by the first processor, and (ii) not execute the second process in response to the received wireless signal being determined to be not the regular wireless signal due to the first process being executed by the first processor. Herein, a power consumption when the first processor executes the first process is smaller than a power consumption when the second processor executes the second process.

That is, according to the vehicle control apparatus of this aspect, the followings may operate. The first process includes a determination process to determine whether or not the received wireless signal is a regular wireless signal. In response to failing to determine that the received wireless signal is a regular wireless signal, the second process including the authentication of the portable terminal is not executed. In addition, the power consumption when executing the first process is smaller than the power consumption when executing the second process. Therefore, the power consumption of the vehicle control apparatus can be suppressed as compared with the configuration in which the second process is always executed instead of the first process and the configuration in which the first process and the second process are always executed. Therefore, even if the vehicle control apparatus is mounted on the vehicle and power is supplied from the battery, it is possible to prevent the battery exhaustion from occurring.

The present disclosure can be realized, in addition to the vehicle control apparatus, in various forms such as: a vehicle equipped with a vehicle control apparatus; a vehicle electronic key system; a portable terminal authentication apparatus; a vehicle control method; a portable terminal authentication method; a computer program for realizing these apparatuses/systems and methods; a storage medium storing such computer program.

What is claimed is:

1. A vehicle control apparatus mounted on a vehicle to perform wireless communication with a portable terminal carried by a user of the vehicle, and control at least a part of functions of the vehicle according to an instruction from the portable terminal, the vehicle control apparatus comprising:
 a first processor configured to execute a first process including a determination process configured to determine whether or not a wireless signal received by an antenna mounted on the vehicle is a regular wireless signal transmitted from the portable terminal; and
 a second processor configured to
  execute a second process including an authentication of the portable terminal in response to the received wireless signal being determined to be the regular wireless signal due to the first process being executed by the first processor, and
  not execute the second process in response to the received wireless signal being determined to be not the regular wireless signal due to the first process being executed by the first processor,
 wherein:
 a power consumption when the first processor executes the first process is smaller than a power consumption when the second processor executes the second process;
 the portable terminal outputs the wireless signal by modulating a transmission data with a modulation corresponding to a predetermined encoding in which two consecutive short bits represent 0 and one long bit represents 1;
 the received signal is encoded with the encoding process in a signal receiver mounted on the vehicle; and
 the determination process in the first process executed by the first processor includes a first sub determination process, the first sub determination process being configured to
  determine whether a counted number of short bits sandwiched by two long bits adjacent to each other in the received signal is an even number or an odd number,
  determine that the received signal is the regular wireless signal in response to determining that the counted number of short bits is the even number, and
  determine that the received signal is not the regular wireless signal in response to determining that the counted number of short bits is the odd number.

2. The vehicle control apparatus according to claim 1, further comprising:

a storage configured to previously store vehicle-related information on the vehicle,
wherein
the second process including the authentication includes:
vehicle-related information included in the received wireless signal is compared with the vehicle-related information stored in the storage to obtain a difference; and
in response to the difference being not within a predetermined range, it is determined that the authentication of the portable terminal is unsuccessful, and
in response to the difference being within the predetermined range, it is determined that the authentication of the portable terminal is successful.

3. The vehicle control apparatus according to claim 1, wherein:
the first processor is configured by an ASIC (Application Specific Integrated Circuit); and
the second processor is configured by a CPU (Central Processing Unit).

4. The vehicle control apparatus according to claim 1, further comprising:
an ASIC (Application Specific Integrated Circuit) and a CPU (Central Processing Unit),
wherein:
the first processor is configured by the ASIC and the CPU;
the second processor is configured by the CPU,
wherein:
the first process includes
(i) the determination process executed by the ASIC for each predetermined first bit width including a predetermined first number of bits, and
(ii) the determination process executed by the CPU in a low speed mode for each predetermined second bit width including a predetermined second number of bits larger than the predetermined first number of bits included in the first bit width; and
the second process includes the authentication executed by the CPU, by using a data indicated by the received wireless signal, in a high speed mode needing a power consumption larger than a power consumption needed by the low speed mode.

5. The vehicle control apparatus according to claim 1, wherein:
the second processor is further configured to execute the second process including the authentication of the portable terminal by using a data indicated by the received wireless signal.

6. The vehicle control apparatus according to claim 1, wherein:
the determination process further includes a second sub determination process configured to determine whether or not a time length of at least one of the short bit and the long bit included in the received signal is within a predetermined time range; and
the first processor is configured to
end the determination process without executing the first sub determination process in response to the second sub determination process determining that the received signal is not the regular wireless signal by determining that the time length is not within the predetermined time range, and
execute the first sub determination process in response to the second sub determination process determining that the time length is within the predetermined time range.

* * * * *